US011321256B2

(12) United States Patent
Amento et al.

(10) Patent No.: US 11,321,256 B2
(45) Date of Patent: *May 3, 2022

(54) PERSISTENT KERNEL FOR GRAPHICS PROCESSING UNIT DIRECT MEMORY ACCESS NETWORK PACKET PROCESSING

(71) Applicant: AT&T Intellectual Property I, L.P., Atlanta, GA (US)

(72) Inventors: Brian S. Amento, Port Murray, NJ (US); Kermit Hal Purdy, Bernardsville, NJ (US); Minsung Jang, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/063,646

(22) Filed: Oct. 5, 2020

(65) Prior Publication Data
US 2021/0034560 A1 Feb. 4, 2021

Related U.S. Application Data

(63) Continuation of application No. 16/186,982, filed on Nov. 12, 2018, now Pat. No. 10,795,840.

(51) Int. Cl.
*G06F 13/28* (2006.01)
*G06T 1/20* (2006.01)
(Continued)

(52) U.S. Cl.
CPC ........ *G06F 13/28* (2013.01); *G06F 15/17331* (2013.01); *G06T 1/20* (2013.01); *H04L 69/324* (2013.01); *G06F 2213/28* (2013.01)

(58) Field of Classification Search
CPC ...... G06F 13/28; G06F 15/17; G06F 2213/28; G06T 1/20
(Continued)

(56) References Cited

U.S. PATENT DOCUMENTS 7,444,637 B2 10/2008 Pronovost et al.
8,458,280 B2 6/2013 Hausauer et al.
(Continued)

FOREIGN PATENT DOCUMENTS

CA 103200128 A 12/2016
CN 106301992 A 1/2017
(Continued)

OTHER PUBLICATIONS

Pang et al., "The TH Express high performance interconnect networks", Frontiers of Computer Science vol. 8, Issue 3 (2014). pp. 357-366. https://www.researchgate.net/profile/Zhengbin_Pang/publication/272012082_The_TH_Express_high_performance_interconnect_networks/links/56c522e408ae736e704712fc/The-TH-Express-highperformance-interconnect-networks.pdf.
(Continued)

*Primary Examiner* — Christopher B Shin

(57) ABSTRACT

A graphics processing unit may, in accordance with a kernel, determine that at least a first packet is written to a memory buffer of the graphics processing unit by a network interface card via a direct memory access, process the at least the first packet in accordance with the kernel, and provide a first notification to a central processing unit that the at least the first packet is processed in accordance with the kernel. The graphics processing unit may further determine that at least a second packet is written to the memory buffer by the network interface card via the direct memory access, process the at least the second packet in accordance with the kernel, where the kernel comprises a persistent kernel, and provide a second notification to the central processing unit that the at least the second packet is processed in accordance with the kernel.

20 Claims, 4 Drawing Sheets

(51) Int. Cl.
    *G06F 15/173* (2006.01)
    *H04L 69/324* (2022.01)
    *G06F 15/17* (2006.01)
(58) Field of Classification Search
    USPC .......................................................... 710/23
    See application file for complete search history.

(56) References Cited

U.S. PATENT DOCUMENTS

| | | | |
|---|---|---|---|
| 8,706,927 | B2 | 4/2014 | Glaeser |
| 8,990,451 | B2 | 3/2015 | Couvee et al. |
| 9,112,889 | B2 | 8/2015 | Evans et al. |
| 9,253,287 | B2 | 2/2016 | Krishnan et al. |
| 9,411,775 | B2 | 8/2016 | Sharp et al. |
| 9,495,718 | B2 | 11/2016 | Lyashevsky |
| 9,535,873 | B2 | 1/2017 | Froening |
| 9,582,463 | B2 | 2/2017 | Cheng et al. |
| 9,602,437 | B1 | 3/2017 | Bernath |
| 9,602,636 | B1 | 3/2017 | Vincent et al. |
| 9,658,981 | B1 | 5/2017 | Rossetti |
| 9,792,248 | B2 | 10/2017 | Shamis et al. |
| 9,860,189 | B2 | 1/2018 | Butcher et al. |
| 9,912,750 | B2 | 3/2018 | Schultz et al. |
| 9,961,002 | B2 | 5/2018 | Feng et al. |
| 10,332,235 | B1 | 6/2019 | Amento et al. |
| 10,795,840 | B2 * | 10/2020 | Amento ................... G06T 1/20 |
| 2003/0140179 | A1 | 7/2003 | Wilt et al. |
| 2007/0112996 | A1 | 5/2007 | Manula et al. |
| 2009/0254683 | A1 | 10/2009 | Camer et al. |
| 2010/0332755 | A1 | 12/2010 | Bu et al. |
| 2012/0154375 | A1 | 6/2012 | Zhang et al. |
| 2013/0139263 | A1 | 5/2013 | Beyah et al. |
| 2014/0055467 | A1 | 2/2014 | Bittner et al. |
| 2014/0149528 | A1 | 5/2014 | VandaVaart et al. |
| 2014/0281615 | A1 | 9/2014 | Panneer et al. |
| 2015/0185811 | A1 | 7/2015 | Connell et al. |
| 2015/0288624 | A1 | 10/2015 | Raindel et al. |
| 2016/0077872 | A1 | 3/2016 | Gu et al. |
| 2016/0117277 | A1 | 4/2016 | Raindel et al. |
| 2016/0226967 | A1 | 8/2016 | Zhang et al. |
| 2016/0292115 | A1 | 10/2016 | Akhter |
| 2016/0335738 | A1 | 11/2016 | Chen et al. |
| 2017/0061566 | A1 | 3/2017 | Min et al. |
| 2017/0147516 | A1 | 5/2017 | De |
| 2017/0180272 | A1 | 6/2017 | Bernath |
| 2017/0277655 | A1 | 9/2017 | Das et al. |
| 2018/0004693 | A1 | 1/2018 | Macnamara et al. |
| 2018/0006970 | A1 | 1/2018 | Browne et al. |
| 2018/0063555 | A1 | 3/2018 | Raduchel et al. |
| 2018/0088858 | A1 | 3/2018 | Basu et al. |
| 2018/0107627 | A1 | 4/2018 | Lebeane et al. |
| 2018/0144435 | A1 | 5/2018 | Chen et al. |
| 2020/0151127 | A1 * | 5/2020 | Amento ............ G06F 15/17331 |

FOREIGN PATENT DOCUMENTS

| | | |
|---|---|---|
| CN | 107124286 A | 9/2017 |
| EP | 3343843 A1 | 7/2018 |
| KR | 101150928 B1 | 5/2012 |
| WO | WO 2014137008 A1 | 9/2014 |
| WO | 2014166404 A1 | 10/2014 |
| WO | 2016160033 A1 | 10/2016 |
| WO | WO 2016/195624 A1 | 12/2016 |

OTHER PUBLICATIONS

Silberstein et al., "GPUnet: Networking abstractions for GPU programs", ACM Transactions on Computing Systems (TOCS) vol. 0, Issue 0, Article 0 (2016). 32 Pages. http://www.cs.utexas.edu/users/witchel/pubs/silberstein16tocsgpunet.pdf.

Kaufmann et al., "High Performance Packet Processing with FlexNIC", ASPLOS '16 Apr. 2-6, 2016, Atlanta, Georgia, USA 15 Pages. https://syslab.cs.washington.edu/papers/flexnic-asplos16.pdf.

Kalia et al., "Design Guidelines for High Performance RDMA Systems", 2016 USENIX Annual Technical Conference (2016), Denver, CO, USA, 14 Pages. https://www.cs.cmu.edu/~akalia/doc/atc16/rdma_bench_atc.pdf.

Miao et al., "SoftRDMA: Rekindling High Performance Software RDMA over Commodity Ethernet", APNet'17, Aug. 3-4, 2017, Hong Kong, China. 7 Pages. https://conferences.sigcomm.org/events/apnet2017/papers/softrdma-miao.pdf.

Ammendola, Roberto, et al. "NaNet a low-latency NIC enabling GPU-based, real-time low level trigger systems." Journal of Physics: Conference Series, vol. 513, No. 1, IOP Publishing, 2014. http://iopscience.iop.org/article/10.1088/1742-6596/513/1/012018/pdf.

Nguyen, Anh, et al. "Reducing data copies between gpus and nics." Cyber-Physical Systems, Networks, and Applications (CPSNA), 2014 IEEE International Conference, IEEE, 2014. http://www.ertl.jp/~shinpei/papers/cpsna14.pdf.

Vasiliadis, Giorgos, et al. "GASPP: A GPU-Accelerated Stateful Packet Processing Framework." USENIX Annual Technical Conference, 2014. https://www.usenix.org/system/files/conference/atc14/atc14-paper-vasiliadis.pdf.

Kaufmann, Antoine, et al. "High performance packet processing with flexnic." ACM SIGARCH Computer Architecture News, vol. 44, No. 2, ACM, 2016. https://dl.acm.org/citation.cfm?id=2872367.

Martinelli, Michele. "GPU I/O persistent kernel for latency bound systems." Proceedings of ACM Conference, Washington, DC, USA (2017). http://www.hpdc.org/2017/posters/poster_files/poster6.pdf.

Capodieci, Nicola; Burgio, Paolo; "Efficient Implementation of Genetic Algorithms on GP-GPU with Scheduled Persistent CUDA Threats", Dec. 2015; 2015 Seventh International Symposium on Parallel Architectures, Algorithms and Programming; p. 7-8 (Year: 2015).

* cited by examiner

PERSISTENT KERNEL FOR GRAPHICS PROCESSING UNIT DIRECT MEMORY ACCESS NETWORK PACKET PROCESSING

This application is a continuation of U.S. patent application Ser. No. 16/186,982, filed on Nov. 12, 2018, now U.S. Pat. No. 10,795,840, which is herein incorporated by reference in its entirety.

The present disclosure relates to network packet processing, and more particularly to methods, computer-readable media, and systems for network packet processing via a persistent graphics processing unit kernel.

BACKGROUND

Packet processing has traditionally been performed on specialized hardware built into network routers and switches. In order to provide more flexibility and minimize expenses, networking tasks have been moving to virtualized frameworks built on top of commodity hardware. This solution works for current network hardware, but as network cards increase to 100 Gb and beyond, the amount of compute power necessary to process packets at line speed is also increasing.

SUMMARY

In one example, the present disclosure describes a method, computer-readable medium, and system for network packet processing via a persistent graphics processing unit kernel. For instance, in one example, a graphics processing unit may, in accordance with a kernel, determine that at least a first packet is written to a memory buffer of the graphics processing unit by a network interface card via a direct memory access, process the at least the first packet in accordance with the kernel, and provide a first notification to a central processing unit that the at least the first packet is processed in accordance with the kernel. The graphics processing unit may further determine that at least a second packet is written to the memory buffer by the network interface card via the direct memory access, process the at least the second packet in accordance with the kernel, where the kernel comprises a persistent kernel, and provide a second notification to the central processing unit that the at least the second packet is processed in accordance with the kernel.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

Figure 1:
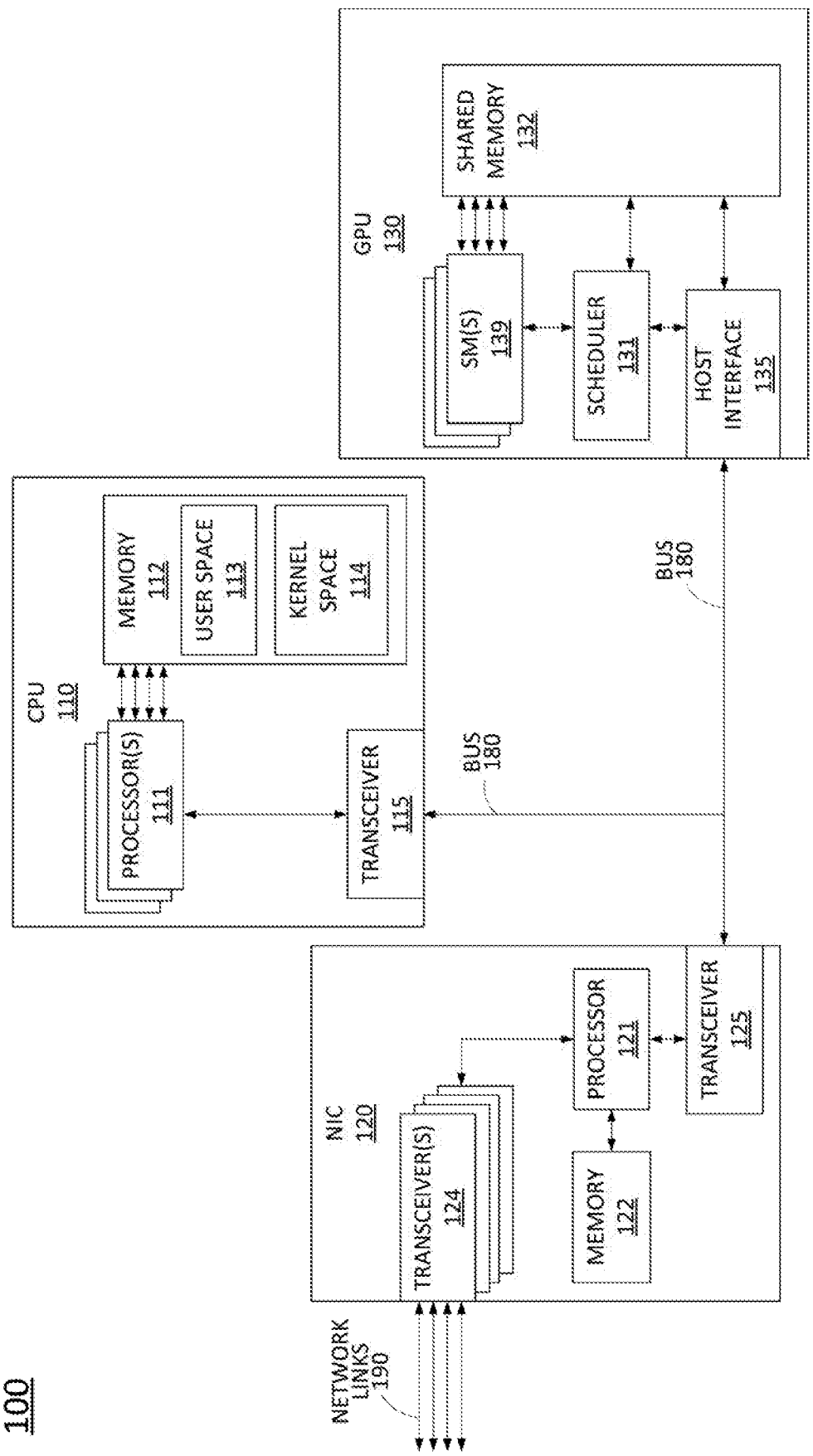
FIG. 1 illustrates an example system or device, e.g., a router, in accordance with the present disclosure.

The present disclosure describes devices, computer-readable media, methods, and systems for network packet processing via a persistent graphics processing unit kernel. Packet processing has traditionally been performed on specialized hardware built into network routers and switches. In order to provide more flexibility and minimize expenses, networking tasks have been moving to virtualized frameworks built on top of commodity hardware. This solution works for current network hardware, but as network cards increase to 100 Gb and beyond, the amount of compute power necessary to process packets at line speed is also increasing. In many instances, central processing unit (CPU) based architectures are not able to keep up.

Examples of the present disclosure provide graphics processing unit (GPU)-based devices (e.g., routers) for high bandwidth, low latency packet processing. Many calculations assume that GPU parallelization techniques can increase packet processing speeds by factors greater than 10. However, these studies assume that the packet data is already in the GPU memory. In a real networking situation, copying packets into the GPU can be slow and may offset the benefits of the increased processing power of the GPU. This issue affects a range of GPGPU (general purpose computing on GPU) tasks. Remote Direct Memory Access (RDMA) techniques provided by GPUDirect have been proposed to overcome this issue. GPUDirect RDMA is optimized for burst data transfers which work for most GPGPU tasks. However, packet processing differs from traditional GPGPU tasks because the data is streaming over a network link and cannot take advantage of large burst transfers.

Examples of the present disclosure provide an architecture for GPU packet processing that overcomes the data transfer bottleneck of GPUDirect RDMA, allowing the full benefit of the GPU for packet processing and other streaming data applications. In particular, examples of the present disclosure initiate direct memory access (DMA) transfers from a network interface card (NIC) to a graphics processing unit (GPU). This is the reverse of other RDMA architectures and results in a substantial increase in transfer speed. In one example, to eliminate performance overhead, polling techniques are used for device access instead of interrupt processing. In one example, a user space poll mode driver is used by a central processing unit (CPU) to interact with the NIC and the GPU. For instance, the user space poll mode driver may comprise a Data Plane Development Kit (DPDK) driver.

In one example, the present disclosure includes a persistent GPU kernel that is launched at the beginning of the application and persists throughout the life of the application. For instance, a memory buffer of the GPU may be created at launch time to receive streaming network packets. The GPU kernel may be notified of the arrival of a new packet, or packets, process the packet(s), and then await notification of the arrival of one or more subsequent packets. This differs from traditional GPU workloads where large datasets are burst at high speed to the GPU memory and many short-lived kernels are launched to perform the processing. It should be noted that a GPU kernel is broadly defined as a software program that runs on one or more streaming multiprocessors on a GPU.

Persistent (e.g., long-lived) GPU kernels enable low latency streaming data processing applications to benefit from the parallel compute power of a GPU by reducing or eliminating the kernel launch overhead. Thus, the GPU kernel persists across many packet processing cycles and continue processing packets as the packets arrive in the GPU memory buffer. In one example, line speed parallel packet processing at the GPU is achieved by using persistent kernels in combination with DMA transfer of network packets from the NIC to the GPU. Examples of the present disclosure have proven performance at line speeds on a 40 GB NIC with GPU resources left to spare.

In addition, it should be noted that as referred to herein, packets, or network packets, may refer to such things as Internet Protocol (IP) packets, transmission control protocol (TCP) datagrams, IP/Multi-Protocol Label Switching (MPLS) packets, or various other protocol data units (PDUs) of a same or similar nature. The packet processing may be for routing and/or network traffic management, such as Layer 2 and/or Layer 3 routing, load balancing, quality of service (QoS), policy enforcement, dropping or blocking packets, intrusion detection, malware detection, etc., may be for application level functions, such as semantic concept detection in images and/or video represented by streaming packets, for image smoothing and/or noise reduction, and so forth. These and other features of the present disclosure are described in greater detail below and in connection with FIGS. 1-4.

To aid in understanding the present disclosure, FIG. 1 illustrates an example device, or system 100, e.g., a router, in accordance with the present disclosure. As illustrated in FIG. 1, the system 100 includes a central processing unit (CPU) 110, a network interface card (NIC) 120, and a graphics processing unit (GPU) 130. The CPU 110 may include one or more processors 111, a memory 112, which may be logically segregated into a user space 113 and a kernel space 114, and a transceiver 115 for communicating with other devices or modules, such as NIC 120 and GPU 130 over a bus 180. The bus 180 may comprise, for example, a Peripheral Component Interface (PCI) bus, or a Peripheral Component Interface express (PCIe) bus.

NIC 120 may include a plurality of transceivers 124 for sending and receiving data via network links 190. For instance, network links 190 may represent connections to other devices and systems via an Ethernet network, or the like. In the example of FIG. 1, transceivers 124 may be for wired communications, optical communications, Layer 2 routing, Layer 3 routing, and so forth. However, in another example, transceivers 124 may be for wireless communications, e.g., for Institute for Electrical and Electronics Engineers (IEEE) 802.11 based communications (e.g., "Wi-Fi"), IEEE 802.15 based communications (e.g., "Bluetooth®," "ZigBee®," etc.), and so forth. In the example of FIG. 1, NIC 120 may include an on-board processor 121 and a memory 122. As further illustrated in FIG. 1, NIC 120 may also include a transceiver 125, e.g., a PCI or PCIe transceiver for communicating with CPU 110 and GPU 130 via bus 180.

GPU 130 may include a host interface 135, e.g., a PCI or PCIe transceiver (PHY) for communicating with CPU 110 and NIC 120 via bus 180. In addition, GPU 130 may include a plurality of streaming multiprocessors (SMs) 139, a shared memory 132 that is accessible to the plurality of SMs 139, and a scheduler 131 for distributing kernels and data processing assignments to various SMs 139. In one example, GPU 130 may be configured, e.g., by CPU 110, to perform various packet routing operations in accordance with the present disclosure. For instance, kernel code may be loaded to the SMs of GPU 130 by CPU 110, wherein the kernel code, when executed by one of SMs 139 and/or core(s) of the SMs 139, performs various routing operations such as: Internet Protocol (IP) address filtering, port filtering, packet classification, encapsulation/decapsulation (e.g., for label switched routing (LSR)), deep packet inspection (DPI) (e.g., for malicious code detection), maintaining counters (e.g., for flow detection, scan detection, etc.), load balancing (e.g., for congested links), and so forth.

Figure 4:
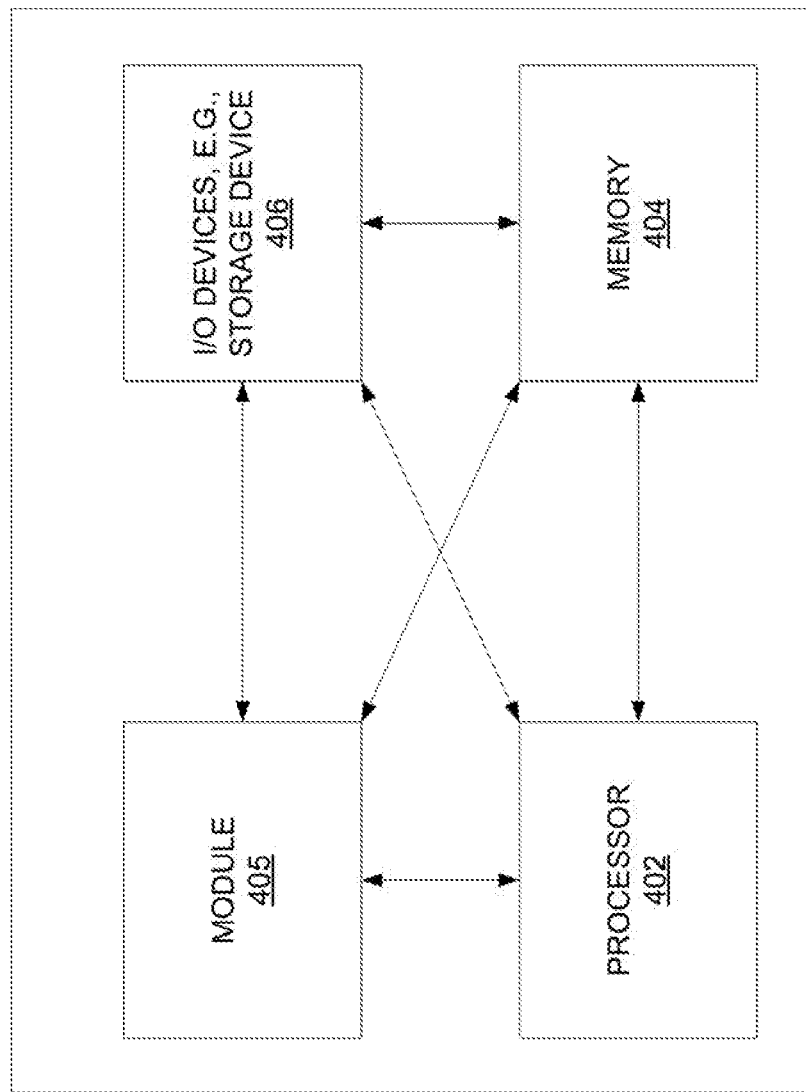
FIG. 4 illustrates an example high-level block diagram of a computer specifically programmed to perform the steps, functions, blocks, and/or operations described herein.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure. In addition, a processing system may refer to a component of a computing device such as one or more streaming multiprocessors (SMs), a processor of a CPU, and so forth.

It should also be noted that various components may be omitted from illustration in the example of FIG. 1, such as one or more registers present in the CPU 110, NIC 120, and/or GPU 130, CPU or SM cores, dynamic random access memory (DRAM), warp schedulers, and so forth present in the SM(s) 139, additional NICs, non-volatile memory (NVM) or storage devices connected to the bus 180, and so forth. In one example, system memory (e.g., DRAM or the like) may be shared among all or a plurality of components of system 100 and may be accessible via bus 180. For instance, an L2 cache may physically reside on one or more memory devices external to the CPU 110 and GPU 130. However, for illustrative purposes, examples herein are described where CPU 110 uses an internal/local memory 112 (host memory) and GPU 130 uses an internal/local shared memory 132 (device memory). The interactions and communications between components of the system 100 are discussed in greater detail below in connection with the example timing diagram of FIG. 2.

Figure 2:
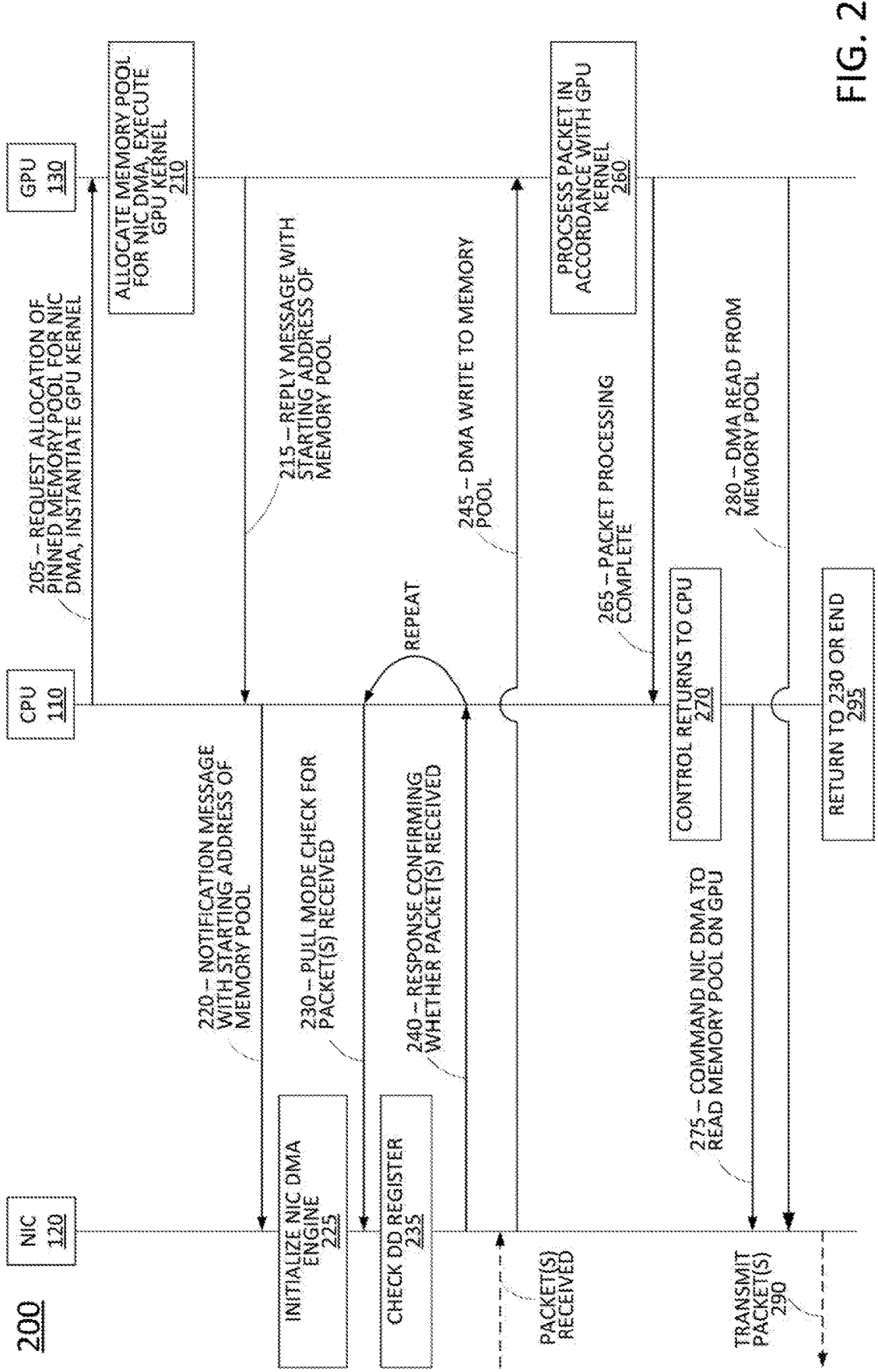
FIG. 2 illustrates an example timing diagram for operation of a system or device in accordance with the present disclosure.

To aid in understanding the present disclosure, FIG. 2 illustrates an example timing diagram of a process 200 for operation of a GPU-based packet processing system, such as the system 100, according to the present disclosure. As illustrated in FIG. 2, the process 200 may begin with stage 205, where CPU 110 may send a message to the GPU 130 requesting or instructing GPU 130 to allocate a pinned memory pool on the GPU memory for a direct memory access (DMA) by NIC 120. In one example, stage 205 may also include instantiating a GPU kernel at the GPU 130. For instance, the CPU 110 may send the kernel (e.g., kernel code and instructions for arranging a plurality of threads of the kernel into at least one thread block) to the GPU 130.

At stage 210, the GPU 130 may allocate the memory pool for use by a DMA engine of NIC 120. In one example, the memory pool is pinned to a PCIe physical memory address. In one example, the pinned memory pool may comprise a shared ring buffer that is readable and writeable by both the NIC 120 and GPU 130. In addition, in accordance with examples of the present disclosure the pinned memory pool is pinned to the shared memory 132. In other words, the pinned memory pool is guaranteed to reside within GPU 130 and may not utilize system memory, host memory, or the like, which may be external to the GPU 130.

In one example, stage 210 may include executing the GPU kernel. For instance, scheduler 131 may invoke one or more of the SMs 139 for packet processing in accordance with the kernel(s). For instance, execution of the kernel(s) may comprise the execution of a plurality of parallel threads (e.g., kernel code) at a plurality of cores of one or more of the SMs 139. In one example, the one or more SMs 139 may reside in a wait loop in accordance with the kernel code awaiting packets to be written to the pinned memory pool in shared memory 132. In one example, the operations at stage 210 may also include creating and/or initializing variables or other data structures (e.g., to be maintained in the shared memory 132 for use by the SMS 139 in accordance with the kernel(s)).

Stage 215 may comprise GPU 130 sending a reply message to the CPU 110 indicating that the pinned memory pool has been allocated and also indicating a starting address of the pinned memory pool. In one example, the reply message may also include a length/size of the pinned memory pool. In another example, the length/size may be implied in accordance with a requested size provided by the CPU 110 in the message of operation 205. In response to receiving the starting address of the pinned memory pool, CPU 110 may then send a message to the NIC 120 at stage 220. The message may indicate an authorization for the DMA engine of NIC 120 to access the GPU memory (i.e., the pinned memory pool portion) at the given address. The message may also include a size of the pinned memory pool. At stage 225, the processor 121 of the NIC 120 may initialize parameters of the DMA engine. The DMA engine of NIC 120 may comprise codes stored in memory 122 and executed by processor 121, for example. The initialization of DMA engine may include various operations. For instance, a first variable comprising a write pointer may be initialized to the starting address received from CPU 110, a second variable may be initialized to store an ending address of the pinned memory pool, e.g., so that the write pointer can be reset to the starting address when the end of the pinned memory pool is reached, a third variable comprising a read pointer may be initialized to the starting address, and so forth.

Once the DMA engine of NIC 120 is initialized, CPU 110 may begin polling the NIC 120 at stage 230 to determine if any packet(s) has/have been received by NIC 120. In one example, the polling comprises one or more of the processors 111 of CPU 110 performing operations in accordance with a poll mode driver residing in the user space 113 of memory 112. In one example, the poll mode driver may comprise a universal input/output (UIO) user space driver. Advantageously, such a driver does not require the invocation of system calls to the kernel space for input/output reads and writes, and avoids delays associated therewith. In one example, the poll mode driver may comprise a Data Plane Development Kit (DPDK) user space driver that operates in poll mode, e.g., without interrupts, and without context switching. However, in accordance with the present disclosure, such a DPDK user space driver may be modified or otherwise configured to not copy data to the host memory (e.g., memory 112 of CPU 110).

In response to a polling message at stage 230, the NIC 120 may check a data delivery (DD) register at stage 235. For instance, the register may be set whenever a packet, or a plurality of packets, is received via network links 190. For instance, in one example, the system 100 may be configured to transfer packets from NIC 120 to GPU 130 after receiving a set threshold number of packets, e.g., 16 packets, 32 packets, etc. In one example, the received packet(s) may be temporarily buffered in memory 122 of the NIC 120 until transferred to the GPU 130 in a small burst. In another example, the received packet(s) may be temporarily buffered in one or more registers of the NIC 120 until transferred to the GPU 130. In one example, the DD register may also be set when a packet-receive timer times out. For example, the threshold may be 32 packets. 30 packets may initially be received. However, a certain duration of time may pass during which no new packets are received. In such case, the DD register may be set so that the 30 packets that are received can be written to the GPU 130 and the packet processing performed without any further delay waiting for additional packets. In general, the threshold number of packets and the packet-receive threshold may be set based upon various factors including the register size(s) at NIC 120, the processing capabilities of GPU 130, the particular packet processing operations that the system 100 is tasked with performing, and so on.

When the packet (or packets) are not received and the DD register is not set, the NIC 120 may transmit a response to CPU 110 at stage 240 indicating that the packet(s) are not yet received. The CPU 110 may continue to poll NIC 120 for packet arrivals, repeating the polling stage 230. However, if at stage 235 it is determined that the register is set and the packet(s) has/have arrived, the response at stage 240 may provide a positive indication that the packet(s) are present.

In addition, when the packet(s) has/have arrived, e.g., when the threshold number of packets are received or the packet receive timer has timed out, the DMA engine of NIC 120 may initiate DMA transfer to the pinned memory pool of GPU 130 (stage 245). In one example, NIC 120 may write the packets directly to the pinned memory pool in accordance with an instruction from the CPU 110. In another example, NIC 120 may proceed with the DMA transfer without instruction from the CPU 110. In particular, DMA engine of NIC 120 may write to the memory address indicated by the write pointer (e.g., in a first iteration of the process 200, to the start address received in the message of stage 220, and in subsequent iterations, to whichever is the current write address of the pinned memory pool indicated by the write pointer) and place the packet(s) on the bus 180. The packet(s) may be received via host interface 135 and written directly into the pinned memory pool comprising a portion of shared memory 132.

In one example, NIC 120 may advance a write pointer based upon the number of packets transferred (and hence the size of the portion of the pinned memory pool that has been written to). In one example, when the packet-receive timer times out and less than a full burst of packets (e.g., 16 packets, 32 packets, etc.) is transferred, the NIC 120 may signal to the CPU 110 the actual number of packets transferred. In another example, the NIC 120 may null pad the burst so that read and/or write pointers may remain synchronized between the NIC 120 and GPU 130 without explicit signaling of the number of packets transferred. It should be noted that CPU 110 may be made aware of the DMA transfer of packet(s) to GPU 130 when a positive confirmation is received at stage 240. In other words, it is implied that NIC 120 has already sent or is in the process of sending the packet(s) when the DD register is set.

At stage 260, the GPU 130 processes the packets in accordance with the kernel(s). For instance, the execution of the kernel(s) may comprise the execution of a plurality of parallel threads at a plurality of cores of one or more of the SMs 139. The operations may include reading, processing, or modifying data in the pinned memory pool of shared memory 132. For instance, read and write pointers for accessing the pinned memory pool may be maintained in shared memory 132 for access by the kernel(s). As mentioned above, a kernel (e.g., persistent kernel) may comprise the one or more SMs sitting in a wait loop in accordance with the kernel code awaiting packets to be written to the pinned memory pool in shared memory 132. Accordingly, in one example, stage 260 may include the one or more SMs checking a memory location in accordance with the read pointer to determine if new packet(s) are written to the pinned memory pool. In other words, the kernel code may configure the SM(s) to check the memory location(s) for the arrival of new packet(s). When new packet(s) is/are detected, the one or more SMs may then continue to execute the kernel code to process the packet(s).

For example, stage 260 may result in an output of a routing decision, the labeling of one or more packets with a label (e.g., for LSR), an incrementing of a flow counter, blocking or dropping packets, and so forth. In one example, such information may be written into one or more header fields of one or more packets for use by the NIC 120 or other devices. In one example, the kernel(s) may comprise the same set of instructions being performing in parallel across several SMs 139 and cores of the SMs 139. Alternatively, or in addition, the kernel(s) may comprise different serial or parallel operations that may be performed on a same packet, or a same set of packets. For instance, a first kernel may be for flow classification (e.g., identifying a flow type, such as a video stream, audio stream, text documents, etc.) in parallel with a second kernel for malware detection.

At stage 265, the GPU 130 completes the packet processing and may send a notification to CPU 110 that the operations are completed. In one example, the SMs 139 of the GPU 130 may write the processed packets back to the pinned memory pool using the same addresses from which the packets were read. In other words, the processed packets may overwrite those that were loaded at stage 245. In such an example, a write pointer of the GPU 130 may be incremented based upon a data size of the packets that were processed. In one example, the kernel(s) (e.g., the kernel threads) may return to a top of a processing loop of the kernel code to await new packet(s) and/or to determine that new packet(s) is/are written to the pinned memory pool for processing. In one example, variables or other data structures may also be reset/reinitialized for the processing of subsequent packets. In other words, the kernel(s) may comprise persistent kernel(s) that are not released when processing of a first batch of packets is completed. Rather, the kernel(s) may remain assigned to SM(s) and may continue to determine that new packets are written to the pinned memory pool for processing. For instance, each kernel (e.g., each kernel thread) may return to the top of a processing loop and may process packets that were unknown at the time CPU 110 instructs the GPU 120 to instantiate the GPU kernel(s), and which may be written to the pinned memory pool of GPU 120 at a later time by NIC 120 via DMA write operations.

At stage 270 the control of process 200 returns to CPU 110. At stage 275, the CPU 110 sends a command to the DMA engine of NIC 120 to read from the pinned memory pool of shared memory 132 at GPU 130. At stage 280, the NIC 120 may read the packets from the pinned memory pool via DMA. For instance, the NIC 120 may issue a read command via the bus 180 directed to a current address of a read pointer associated with the shared memory pool. In addition, in one example, the NIC 120 may read out a portion of the pinned memory pool based upon a size of the transfer at stage 245. The NIC 120 may also advance a read pointer in accordance with the starting address of the read pointer and the volume of data that is read via the DMA transfer of stage 280. In another example, the notification of stage 265 and the command of stage 275 may indicate a size/length of the portion of the pinned memory pool to be read.

At stage 290, the packet(s) are transmitted via transceivers 124 and network links 190. For example, processor 121 may distribute the packet(s) to transceivers 124 for routing via one of the network links 190 that may be selected in accordance with one or more routing criteria. For instance, as discussed above, routing criteria may be written into a packet header by the GPU 130 at stage 260. It should be noted that in one example, the packet(s) are not copied into NIC memory before being placed back on the wire. However, in one example, the packet(s) may be loaded into one or more transmit buffers (e.g., hardware registers) to implement a policy (e.g., layer 1/physical layer policy processing).

It should be understood that in various examples, all or a portion of the process 200 may continue as additional packets are received by NIC 120. For instance, after or as a part of stage 245, the DD register of NIC 120 may be reset. At stage 295, the CPU 110 may return to stage 230 or the process 200 may end. For instance, operations or stages 230-295 may then continue for as long as the system 100 remains powered on and in operation. It should also be noted that although the GPU kernel(s) may comprise persistent kernel(s), various conditions may result in the release of the kernel(s) from SM assignments. For example, CPU 110 may send an interrupt message which may cause a kernel code to exit a loop and shut down. For instance, CPU 110 may send a message to scheduler 131 to cause the kernel(s) to be shut down and the SM(s) released for reassignment. Alternatively, or in addition, CPU 110 may also have access to a portion of shared memory 132 where CPU 110 may set a flag for one or more kernels to read, and where the kernel code may cause a loop exit in accordance with the flag.

It should also be noted that in various examples, the process 200 may be modified or may have a different form from that which is described above and illustrated in FIG. 2. For instance, in one example, control of process 200 may return to CPU 110 between stages 245 and 260. In addition, in such an example, CPU 110 may send a message to invoke one or more kernels for processing the packet(s). To illustrate, CPU 110 may have access to a portion of shared memory 132 where CPU 110 may set a flag for one or more kernels to read, and where the kernel code may cause the packet processing operations to commence, e.g., accessing packet(s) in the pinned memory pool, performing various operations associated with the packet(s), and outputting a routing decision, labeling one or more packets with a label (e.g., for LSR), incrementing of a flow counter, blocking or dropping packets, and so forth.

Alternatively, or in addition, the CPU 110 may notify the scheduler 131 of the arrival of new packet(s) at the pinned memory buffer. In such an example, the scheduler 131 may maintain read and write pointers for accessing the pinned memory pool. The scheduler 131 may also instruct different SMs 139 (e.g., in accordance with the kernel threads being executed by the different SMs 139) to access different packets at different addresses in accordance with the read and write pointers. For instance, if 32 packets are written into the pinned memory pool at stage 245 and the GPU 130 is configured for parallel processing of 32 packets, the scheduler 131 may determine a starting address for each packet, beginning at a current address stored in the read pointer and advancing to subsequent addresses based upon the size of the packets. The scheduler 131 may then provide the respective packet start addresses to the assigned SMs 139. In addition, the scheduler 131 may advance the read pointer based upon the overall data volume of the 32 packets. Thus, these and other modifications are all contemplated within the scope of the present disclosure.

Figure 3:
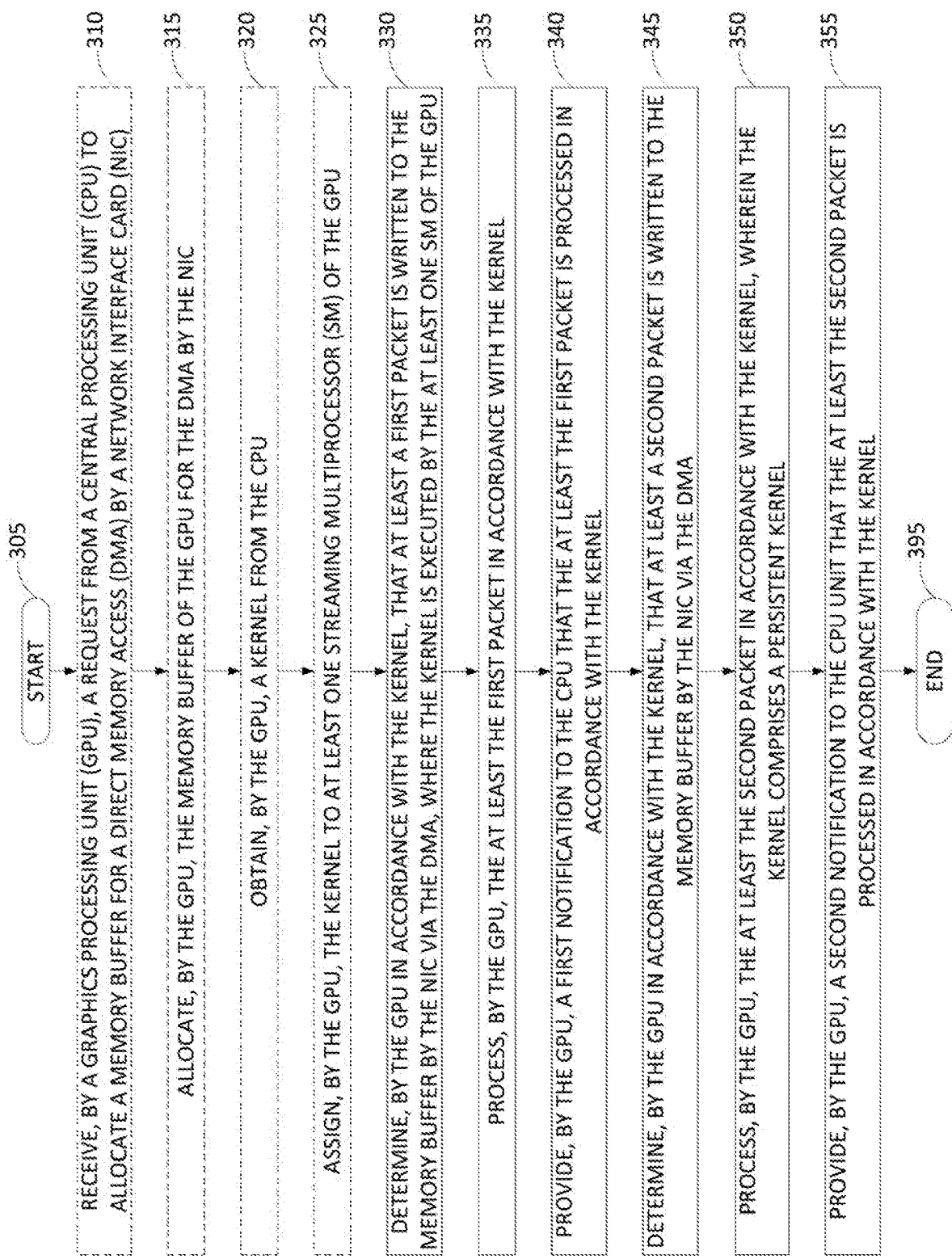
FIG. 3 illustrates a flowchart of an example method for network packet processing via a persistent graphics processing unit kernel.

FIG. 3 illustrates a flowchart of an example method 300 for network packet processing via a persistent graphics processing unit kernel. In one example, the method 300 is performed by a device such as GPU 130 of FIG. 1 and/or any one or more components thereof, such as at least one streaming multiprocessor (SM), at least one SM and a scheduler, etc., by GPU 130 in conjunction with one or more other devices, such as NIC 120 and/or CPU 110, or by the system 100 in general. Alternatively, or in addition, the steps, functions, or operations of method 300 may be performed by a device or system 400, and/or processor 402 as described in connection with FIG. 4 below. For instance, the system 400 may represent all or a portion of the system 100 of FIG. 1. For illustrative purposes, the method 300 is described in greater detail below in connection with an example performed by a GPU, such as GPU 130. The method begins in step 305 and may proceed to optional step 310 or to step 330.

At optional step 310, the GPU may receive a request from a CPU to allocate a memory buffer of the GPU for a direct memory access (DMA) by a NIC. In one example, optional step 310 may comprise the same or similar operations as stage 205 of the process 200 described above.

At optional step 315, the GPU may allocate a memory buffer of the GPU for direct memory access (DMA) by a NIC. In one example, the memory buffer is a pinned memory buffer (or memory pool). In addition, in one example, the memory buffer may be allocated as a shared ring buffer for access by both the GPU and the NIC. In one example, optional step 315 may comprise the same or similar operations as stage 210 of the process 200 described above.

At optional step 320, the GPU may obtain a kernel from the CPU. For example, the kernel may comprise kernel code for execution as a plurality of threads and instructions for arranging a plurality of threads of the kernel into at least one thread block. In accordance with the present disclosure, the kernel code may be for processing packets, e.g., for outputting a routing decision, labeling one or more packets with a label (e.g., for LSR), incrementing of a flow counter, blocking or dropping packets, etc.

At optional step 325, the GPU may assign the kernel to at least one streaming multiprocessor (SM) of the GPU, e.g., from among a plurality of SMs at the GPU. In addition, in one example, step 325 may include assigning threads of the kernel to various cores of the SM(s) for processing the packets (e.g., as one or more thread blocks). In one example, the kernel may be received at a host interface of the GPU and provided to a scheduler of the GPU. The GPU, via the scheduler, may then assign the kernel to the at least one SM, e.g., in accordance with the instructions that may be obtained at optional step 320. In one example, the kernel may be run as a plurality of parallel threads at a plurality of cores of one or more of the SMs. In one example, the one or more SMs may reside in a wait loop in accordance with the kernel code awaiting packets to be written to the memory buffer. In one example, the operations at step 325 may also include creating and/or initializing variables or other data structures (e.g., to be maintained in a shared memory and/or the pinned memory buffer of the GPU for use by the SMs in accordance with the kernel.

At step 330, the GPU may determine in accordance with the kernel that at least a first packet is written to the memory buffer by the NIC via the DMA. For example, the kernel (e.g., kernel threads) may be executed by at least one streaming multiprocessor (SM) of the GPU. In one example, the at least one SM may be sitting in a wait loop in accordance with the kernel code awaiting packets to be written to the memory buffer. In one example, read and write pointers for accessing the memory buffer may be maintained in the shared memory and/or the pinned memory buffer for access by the SM(s) in accordance with the kernel. Thus, in one example, the determining that at least the first packet is written to the memory buffer comprises inspecting a first memory address of the memory buffer for new data, e.g., in accordance with a read pointer for the memory buffer. In other words, the kernel code may configure the SM(s) to check the memory location(s) for the arrival of new packet(s). When new packet(s) is/are detected, the SM(s) may then continue to execute the kernel code to process the new packet(s) (e.g., the "at least the first packet").

In another example, step 330 may comprise the GPU receiving from a CPU a first notification that at last the first packet is written to the memory buffer by the NIC via DMA. In one example, the notification may comprise a flag set by the CPU in a register, in a shared memory and/or the memory buffer of the GPU that is accessible to the CPU, or in a global memory of the system that is accessible to both the CPU and the GPU, to be read by one or more SMs in accordance with the kernel (e.g., in accordance with the kernel code). In another example, the notification may comprise a message to a scheduler of the GPU of the arrival of new packet(s) at the memory buffer. In such an example, the scheduler may maintain read and write pointers for accessing the memory buffer. The scheduler may also instruct the at least one SM, e.g., a plurality of SMs, in accordance with the kernel threads being executed by the different SMs, to access different packets at different addresses in accordance with the read and write pointers.

At step 335, the GPU processes at least the first packet in accordance with the kernel. For example, when new packet(s) is/are detected, the SM(s) may then continue to execute the kernel code to process the new packet(s) (e.g., the "at least the first packet"). For example, the kernel code may cause the SM(s) to access packet(s) in the memory buffer, perform various operations associated with the packet(s), and output a routing decision, label one or more packets with a label, increment of a flow counter, mark one or more packets for blocking or dropping, and so forth. In one example, the SM(s) may write the processed packet(s) back to the memory buffer using the same addresses from which the packet(s) was/were read. In other words, the processed packet(s) may overwrite those that were determined to be present at step 330. In such an example, a write pointer of the GPU may be incremented based upon a data size of the packets that were processed.

At step 340, the GPU provides a first notification to the CPU that at least the first packet is processed in accordance with the kernel. In one example, step 340 may include the GPU setting a polling flag to indicate that the kernel is applied. For example, the GPU may set a register for a poll mode driver of the CPU which, when read, indicates whether or not the packet processing is complete. In another example, the polling flag may be set in a shared memory of the GPU that is accessible to the CPU, or may be set in a global memory of the system that is accessible to both the CPU and the GPU. The CPU may read the polling flag, determine the GPU-based packet processing is completed, and notify the NIC that the processing of at least the first packet is completed (and/or instruct the NIC to read at least the first packet from the memory buffer). In another example, the first notification may comprise one or more messages (e.g., interrupt messages) from the one or more of the SMs that packet processing is completed.

In one example, the NIC may read at least the first packet from the memory buffer via the DMA in response to the notification and/or instruction. In addition, in accordance with the present disclosure the kernel comprises a persistent kernel. For instance, the kernel may remain in the GPU memory beyond the end of the application of the kernel to at least the first packet. In one example, the kernel (e.g., the kernel threads) may remain assigned to one or more particular SM(s). In one example, each of the kernel threads includes a loop that reinitializes for processing subsequent packets. In one example, step 340 may therefore include resetting/reinitializing registers, variables, or other data structures, but the kernel does not need to be re-instantiated (e.g., reassigned to SM(s)) for the processing of subsequent packets that may be written into the memory buffer.

At step 345, the GPU may determine in accordance with the kernel that at least a second packet is written to the memory buffer by the NIC via the DMA. For example, the kernel (e.g., kernel threads) may continue to be executed by the at least one SM of the GPU. For instance, following step 340 the at least one SM may be sitting in a wait loop in accordance with the kernel code awaiting packets to be written to the memory buffer. In one example, the determining that at least the second packet is written to the memory buffer comprises inspecting a second memory address of the memory buffer for new data, e.g., in accordance with a read pointer for the memory buffer.

In another example, step 345 may comprise the GPU receiving from a CPU a second notification that at least the second packet is written to the memory buffer by the NIC via DMA. In such an example, the first notification of step 330 and the second notification of step 345 may comprise notification flags set via a register, notification flags written to a shared memory of the GPU or to a global memory accessible to both the CPU and the GPU, may comprise instructions from the CPU to a scheduler of the GPU, and so forth. In one example, step 345 may comprise the same or similar operations as step 330. However, at least the second packet may be written to the memory buffer after the processing of at least the first packet at step 335.

At step 350, the GPU processes at least the second packet in accordance with the kernel. In one example, step 350 may comprise the same or similar operations as step 335. Notably, the kernel remains assigned to the at least one SM from the processing of at least the first packet to the processing of at least the second packet.

At step 355, the GPU provides a second notification to the CPU that at least the second packet is processed in accordance with the kernel. In one example, step 355 may comprise the same or similar operations as step 340.

Following step 355, the method 300 may proceed to step 395 where the method 300 ends.

It should be noted that the method 300 may be expanded to include additional steps or may be modified to include additional operations with respect to the steps outlined above, may be modified to omit certain steps, and so forth.

For instance, in various examples the method 300 may be repeated through various cycles of receiving packets at a NIC, writing packets to a GPU memory buffer via DMA, processing the packets at the GPU, and reading the packets back from the GPU memory buffer by a NIC via DMA. For instance, FIG. 3 provides two cycles of receiving packet(s) and processing packet(s) to illustrate that the GPU kernel comprises a persistent kernel. However, the method 300 may continue for numerous additional cycles, e.g., repeating steps 330-340 and/or steps 345-355 for subsequent groups of one or more packets.

In another example, the GPU may transmit to the CPU a confirmation of an allocation of the memory buffer of the GPU to the NIC for DMA. In one example, the confirmation may include a starting memory address of the memory buffer and a size of the memory buffer. The CPU may then provide this information to a NIC DMA engine, e.g., to allow the NIC to maintain its own read pointer and write pointer for accessing the shared memory buffer of the GPU. For example, the NIC may initialize the DMA engine in accordance with the notification that is received, e.g., setting buffer start/end addresses, initializing read and write pointers, and so forth.

In still another example, at least the first packet may be written to the memory buffer by the NIC via the DMA in a first block of packets of a defined size, and at least the second packet may be written to the memory buffer by the NIC via the DMA in a second block of packets of a defined size. Thus, one or more SMs may then access respective memory locations to access at least the first packet and at least the second packet. For example, a first SM may access a memory location indicated by the read pointer in accordance with a first kernel thread, the same or a different SM may access a memory location where a next packet is expected to begin in accordance with the read pointer and a known packet size, and so forth up to a number of packets in a defined packet burst size. In one example, the method 300 may be modified or expanded to include any operations described above in connection with the example process 200 of FIG. 2. Thus, these and other modifications are all contemplated within the scope of the present disclosure.

In addition, although not specifically specified, one or more steps, functions or operations of the method 300 may include a storing, displaying and/or outputting step as required for a particular application. In other words, any data, records, fields, and/or intermediate results discussed in the method can be stored, displayed and/or outputted either on the device executing the method or to another device, as required for a particular application. Furthermore, steps, blocks, functions or operations in FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method(s) can be combined, separated, and/or performed in a different order from that described above, without departing from the example examples of the present disclosure. Thus, the use of the term "optional step" is intended to only reflect different variations of a particular illustrative embodiment and is not intended to indicate that steps not labelled as optional steps to be deemed to be essential steps.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor, a co-processor, such as a GPU, and so forth), a memory 404 (e.g., random access memory (RAM) and/or read only memory (ROM)), a module 405 for network packet processing via a persistent graphics processing unit kernel, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). In accordance with the present disclosure input/output devices 406 may also include transceivers, power units, and so forth. Although only one processor element is shown, it should be noted that the computing device may employ a plurality of processor elements. Furthermore, although only one computing device is shown in the figure, if the method 300 as discussed above is implemented in a distributed or parallel manner for a particular illustrative example, i.e., the steps of the above method 300, or the entire method 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 300. In one example, instructions and data for the present module or process 405 for network packet processing via a persistent graphics processing unit kernel (e.g., a software program comprising computer-executable instructions) can be loaded into memory 404 and executed by hardware processor element 402 to implement the steps, functions or operations as discussed above in connection with the illustrative method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for network packet processing via a persistent graphics processing unit kernel (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
determining, by a graphics processing unit in accordance with a kernel, that at least a first packet is written to a memory buffer of the graphics processing unit by a computing device via a direct memory access, wherein the kernel is executed by at least one streaming multiprocessor of the graphics processing unit;
processing, by the graphics processing unit, the at least the first packet in accordance with the kernel;
providing, by the graphics processing unit, a first notification to a central processing unit that the at least the first packet is processed in accordance with the kernel;
determining, by the graphics processing unit in accordance with the kernel, that at least a second packet is written to the memory buffer by the computing device via the direct memory access;
processing, by the graphics processing unit, the at least the second packet in accordance with the kernel, wherein the kernel comprises a persistent kernel; and
providing, by the graphics processing unit, a second notification to the central processing unit that the at least the second packet is processed in accordance with the kernel.

2. The method of claim 1, wherein the kernel remains assigned to the at least one streaming multiprocessor from the processing of the at least the first packet to the processing of the at least the second packet.

3. The method of claim 1, wherein the determining that the at least the first packet is written to the memory buffer comprises:
receiving, by the graphics processing unit from the central processing unit, a first indicator that the at least the first packet is written to the memory buffer by the computing device via the direct memory access.

4. The method of claim 3, wherein the determining that the at least the second packet is written to the memory buffer comprises:
receiving, by the graphics processing unit from the central processing unit, a second indicator that the at least the second packet is written to the memory buffer by the computing device via the direct memory access.

5. The method of claim 4, wherein the first indicator and the second indicator comprise notification flags written to a shared memory of the graphics processing unit by the central processing unit.

6. The method of claim 4, wherein the first indicator and the second indicator comprise instructions from the central processing unit to a scheduler of the graphics processing unit.

7. The method of claim 1, wherein the determining that the at least the first packet is written to the memory buffer comprises:
inspecting a first memory address of the memory buffer for new data.

8. The method of claim 7, wherein the determining that the at least the second packet is written to the memory buffer comprises:
inspecting a second memory address of the memory buffer for new data.

9. The method of claim 8, wherein the first memory address and the second memory address are in accordance with a read pointer for the memory buffer.

10. The method of claim 9, wherein the at least the first packet is written to the memory buffer by the computing device via the direct memory access in a first block of packets of a defined size, and wherein the at least the second packet is written to the memory buffer by the computing device via the direct memory access in a second block of packets of the defined size.

11. The method of claim 1, wherein the computing device comprises at least one of: a transceiver or a direct memory access engine.

12. The method of claim 1, further comprising:
allocating, by the graphics processing unit, the memory buffer of the graphics processing unit for the direct memory access by the computing device.

13. The method of claim 12, further comprising:
receiving, by the graphics processing unit, a request from the central processing unit to allocate the memory buffer for the direct memory access by the computing device.

14. The method of claim 1, further comprising:
obtaining, by the graphics processing unit, the kernel from the central processing unit.

15. The method of claim 14, further comprising:
assigning, by the graphics processing unit, the kernel to the at least one streaming multiprocessor of the graphics processing unit.

16. The method of claim 14, wherein the kernel comprises:
kernel code for execution as a plurality of threads; and
instructions for arranging the plurality of threads of the kernel into at least one thread block.

17. The method of claim 16, wherein the at least one streaming multiprocessor comprises a plurality of streaming multiprocessors, wherein each of the at least one thread block is assigned to a respective streaming multiprocessor of the plurality of streaming multiprocessors of the graphics processing unit.

18. The method of claim 1, wherein the at least the second packet is written to the memory buffer after the processing the at least the first packet via the kernel.

19. A non-transitory computer-readable medium storing instructions which, when executed by a graphics processing unit, cause the graphics processing unit to perform operations, the operations comprising:
determining that at least a first packet is written to a memory buffer of the graphics processing unit by a computing device via a direct memory access;
processing the at least the first packet in accordance with the instructions, wherein the instructions comprise a kernel;
providing a first notification to a central processing unit that the at least the first packet is processed in accordance with the kernel;
determining that at least a second packet is written to the memory buffer by the computing device via the direct memory access;
processing at least the second packet in accordance with the instructions, wherein the kernel comprises a persistent kernel; and
providing a second notification to the central processing unit that the at least the second packet is processed in accordance with the kernel.

20. A device comprising:
a graphics processing unit; and
a non-transitory computer-readable medium storing instructions which, when executed by the graphics processing unit, cause the graphics processing unit to perform operations, the operations comprising:
determining that at least a first packet is written to a memory buffer of the graphics processing unit by a computing device via a direct memory access;
processing the at least the first packet in accordance with the instructions, wherein the instructions comprise a kernel;
providing a first notification to a central processing unit that the at least the first packet is processed in accordance with the kernel;
determining that at least a second packet is written to the memory buffer by the computing device via the direct memory access;
processing at least the second packet in accordance with the instructions, wherein the kernel comprises a persistent kernel; and
providing a second notification to the central processing unit that the at least the second packet is processed in accordance with the kernel.

* * * * *